(12) United States Patent
Hsu

(10) Patent No.: US 9,717,215 B2
(45) Date of Patent: Aug. 1, 2017

(54) PET FEEDER

(71) Applicant: SDY International Co., Ltd., Taichung (TW)

(72) Inventor: Wei-Tien Hsu, Taichung (TW)

(73) Assignee: SDY International Co., Ltd., Taichung (TW)

( * ) Notice: Subject to any disclaimer, the term of this patent is extended or adjusted under 35 U.S.C. 154(b) by 167 days.

(21) Appl. No.: 14/834,589

(22) Filed: Aug. 25, 2015

(65) Prior Publication Data

US 2017/0055491 A1    Mar. 2, 2017

(51) Int. Cl.
| | | |
|---|---|---|
| *A01K 5/01* | (2006.01) |
| *B65D 21/02* | (2006.01) |
| *B65D 25/22* | (2006.01) |
| *A47G 23/02* | (2006.01) |

(52) U.S. Cl.
CPC ........ *A01K 5/0114* (2013.01); *B65D 21/0212* (2013.01); *B65D 21/0216* (2013.01); *A01K 5/0142* (2013.01); *A47G 23/0216* (2013.01); *B65D 25/22* (2013.01)

(58) Field of Classification Search
CPC ...... A47G 23/0216; B60N 3/10; B60N 3/105; A47B 87/0246; B65D 21/0212; B65D 21/0213; B65D 21/0209; B65D 21/0215; B65D 21/0216; B65D 21/0235; B65D 21/0237; B65D 21/0238; B65D 21/041; B65D 21/048; B65D 25/22; A01K 5/0114; A01K 5/0142; A01K 5/00

USPC ........... 248/311.2, 314, 310, 309.1; 206/501, 206/503, 509, 514, 511, 505–507; 220/629, 630, 634; 119/61.5

See application file for complete search history.

(56) References Cited

U.S. PATENT DOCUMENTS

| | | | | |
|---|---|---|---|---|
| 948,014 | A | * 2/1910 | Lewis | .................. A01K 5/0114 119/61.5 |
| D229,074 | S | * 11/1973 | Cuprak | ................ A01K 5/0114 119/61.5 |
| 3,883,037 | A | * 5/1975 | Seiller | ................ A47B 87/0269 206/5 |
| 4,145,841 | A | * 3/1979 | Woolpert | ................. A01G 9/02 47/66.1 |
| 4,643,312 | A | * 2/1987 | Zarges | ................... B65D 21/02 206/501 |
| 5,031,575 | A | * 7/1991 | Phillips | ................. A01M 29/34 119/61.53 |

(Continued)

*Primary Examiner* — Joshua Huson
(74) *Attorney, Agent, or Firm* — Alan D. Kamrath; Kamrath IP Lawfirm, P.A.

(57) ABSTRACT

A pet feeder includes an assembly base and a feeder body. The assembly base includes a base body having an annular external rim provided with a plurality of pluggable fins. The feeder body includes an annular surrounding wall and a feeding trough defined inside the surrounding wall. The surrounding wall of the feeder body is provided with several sets of slots arranged in a circumferential direction about a central axis thereof and annularly spaced from each other in the circumferential direction. Each of the several sets of slots extends a distinct depth and has a plurality of slots matching the pluggable fins of the assembly base. As such, a height of the feeding trough of the feeder body can be conveniently adjusted when one of the several sets of slots with a specific depth is coupled with the pluggable fins of the assembly base.

6 Claims, 5 Drawing Sheets

(56) References Cited

U.S. PATENT DOCUMENTS

| | | | | |
|---|---|---|---|---|
| 5,397,033 A * | 3/1995 | Blomquist | B65D 83/04 | 119/53 |
| 5,596,946 A * | 1/1997 | Bryant | A01K 5/0225 | 119/52.1 |
| 5,761,848 A * | 6/1998 | Manlove | A01G 9/10 | 47/65.5 |
| 6,131,334 A * | 10/2000 | Fan | A01G 27/04 | 47/71 |
| 6,296,118 B1 * | 10/2001 | Speck | B65D 21/043 | 206/408 |
| 6,381,900 B1 * | 5/2002 | Crowley | A01G 9/024 | 47/29.1 |
| 6,513,281 B2 * | 2/2003 | Roberts | A01M 29/34 | 248/188.4 |
| 7,207,291 B1 * | 4/2007 | Watts | A01K 5/0114 | 119/61.5 |
| D590,109 S * | 4/2009 | Anderson | A01K 5/0128 | D30/129 |
| 7,730,664 B2 * | 6/2010 | Larwood | A01G 9/02 | 47/66.1 |
| 8,177,086 B2 * | 5/2012 | Marquis-Martin | H02G 3/121 | 220/3.4 |
| 8,448,812 B2 * | 5/2013 | Gruber | B65F 1/122 | 220/630 |
| 9,451,761 B2 * | 9/2016 | Messina | A01M 1/2011 | |
| 9,521,815 B2 * | 12/2016 | Panopoulos | A01G 9/02 | |
| 2003/0033986 A1 * | 2/2003 | Brown | A01K 5/0128 | 119/61.5 |
| 2003/0094393 A1 * | 5/2003 | Sahm, III | B65D 1/42 | 206/505 |
| 2003/0160055 A1 * | 8/2003 | Stewart-Stand | A45F 3/20 | 220/666 |
| 2005/0039689 A1 * | 2/2005 | Mossmer | A01K 5/0128 | 119/61.5 |
| 2006/0005774 A1 * | 1/2006 | Newman Bornhofen | A01K 5/0135 | 119/61.5 |
| 2007/0089678 A1 * | 4/2007 | Greenwood | A01K 5/0114 | 119/61.5 |
| 2008/0035067 A1 * | 2/2008 | Ogden | A01K 5/0128 | 119/61.5 |
| 2009/0126641 A1 * | 5/2009 | Anderson | A01K 5/0135 | 119/61.5 |
| 2010/0024737 A1 * | 2/2010 | Asimou | A01K 5/0121 | 119/61.5 |
| 2010/0275852 A1 * | 11/2010 | Lipscomb | A01K 5/0114 | 119/61.5 |
| 2011/0220665 A1 * | 9/2011 | McDonnell | A47G 19/2227 | 220/592.17 |
| 2011/0303659 A1 * | 12/2011 | Perlman | A45F 3/20 | 220/8 |
| 2014/0027335 A1 * | 1/2014 | Chen | B65D 1/42 | 206/505 |
| 2014/0352621 A1 * | 12/2014 | Fairbanks | A01K 5/0128 | 119/61.53 |
| 2014/0373790 A1 * | 12/2014 | Asimou | A01K 5/0121 | 119/61.5 |
| 2015/0274377 A1 * | 10/2015 | Wiley | B65D 11/06 | 206/508 |

* cited by examiner

PET FEEDER

BACKGROUND OF THE INVENTION

The present invention relates to a pet feeder and, more particularly, to a pet feeder in which the height of a feeding trough is adjustable according to the size of a pet eating food in the feeding trough.

The emotional tension of modern people who have hectic lives can be moderated by lovable pets. A pet owner, however, has to change a food bowl when a pup grows up to be an adult quickly. Therefore, how to adjust the height of a pet feeder according to transformation of a pet's size without frequency changes of food bowls is an important issue.

Taiwan Utility Model No. M461320 discloses a pet bowl support including a tray seat, an assembly member, a set of parallel linkage and several sets of pet bowls. The tray seat has an insertion hole, and a stud is equipped on a bottom of the assembly member and is inserted into the insertion hole. At default positions on the assembly member are opened two assembly holes in which lower ends of the parallel linkage are inserted. Each food bowl has two positioning boards used to engage on the parallel linkage. As such, several food bowls can be installed on the parallel linkage and are respectively adjustable in height. The pet bowl support, however, has complex structure and may cause environmental pollution or perplex a pet owner because the food bowls positioned on the parallel linkage are easily loosen or even overturned.

Therefore, a structurally-simple pet feeder is required for improving the above mentioned problems and drawbacks.

BRIEF SUMMARY OF THE INVENTION

It is an objective of the present invention to provide a structurally-simple and low-cost pet feeder in which the height of a feeding trough is easily adjustable according to the size of a pet eating food.

To achieve this and other objectives, a pet feeder of the present invention includes an assembly base and a feeder body. The assembly base includes a base body having an annular external rim, a top surface, and a bottom. The assembly base further includes a plurality of pluggable fins protruding from the external rim of the base body and annularly spaced from one another. Each pluggable fin has an upper end and a lower end, with the upper end of each of the pluggable fins exceeding the top surface of the base body in a height direction of the base body. The feeder body includes an annular surrounding wall and a feeding trough defined inside the surrounding wall. The surrounding wall of the feeder body includes a bottom edge and a top edge. The surrounding wall of the feeder body is provided with several sets of slots arranged in a circumferential direction about a central axis of the surrounding wall and annularly spaced from each other in the circumferential direction. Each of the several sets of slots includes a plurality of slots matching the pluggable fins of the assembly base, with each of the several sets of slots extending from the bottom edge of the surrounding wall toward but spaced from the top edge. The several sets of slots respectively extend a distinct depth in the height direction of the base body, and the plurality of slots in each of the several sets of slots having a substantially identical depth in the height direction of the base body. A spacing between two adjacent slots in each of the several sets of slots is substantially equal to a spacing between two adjacent pluggable fins of the assembly base. The pluggable fins of the assembly base are insertable into and coupled with one of the several sets of slots optionally Preferably, the lower end of each of the pluggable fins is generally level with the bottom of the base body in the height direction of the base body. The upper end of each of the pluggable fins has a raised stop portion on an inner end thereof. The one of the several sets of slots coupled with the pluggable fins of the assembly base resists the upper ends of the pluggable fins and is limited by the stop portions of the pluggable fins.

In a preferred form, the lower end of each of the pluggable fins is internally provided with a recess in which a counterweight is provided. The recess is coupled with a non-slip pad which is installed at a lower end of the recess.

The present invention will become clearer in light of the following detailed description of an illustrative embodiment of this invention described in connection with the drawings.

DESCRIPTION OF THE DRAWINGS

The illustrative embodiment may best be described by reference to the accompanying drawings where.

DETAILED DESCRIPTION OF THE INVENTION

Figure 1:
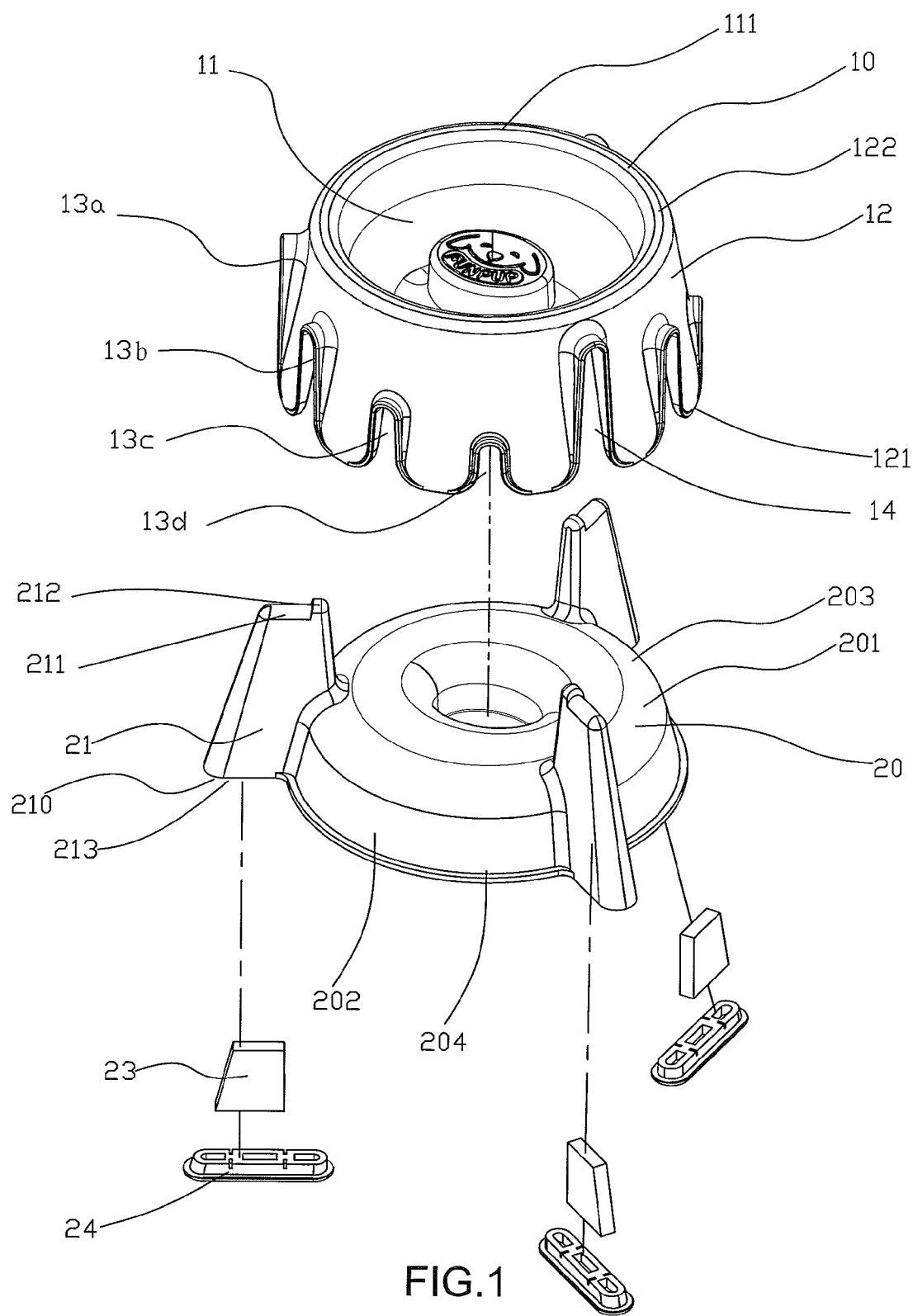
FIG. 1 is an exploded, perspective view of a pet feeder of the present invention.
Figure 2:
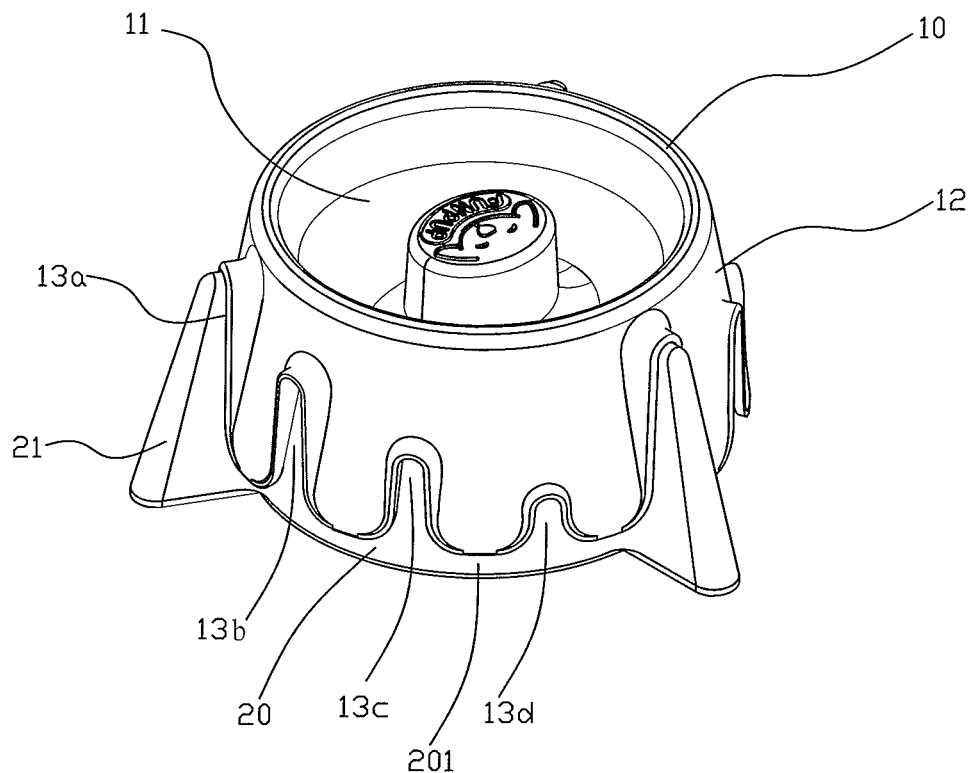
FIG. 2 is a schematic view of the pet feeder of FIG. 1 which is assembled.
Figure 3:
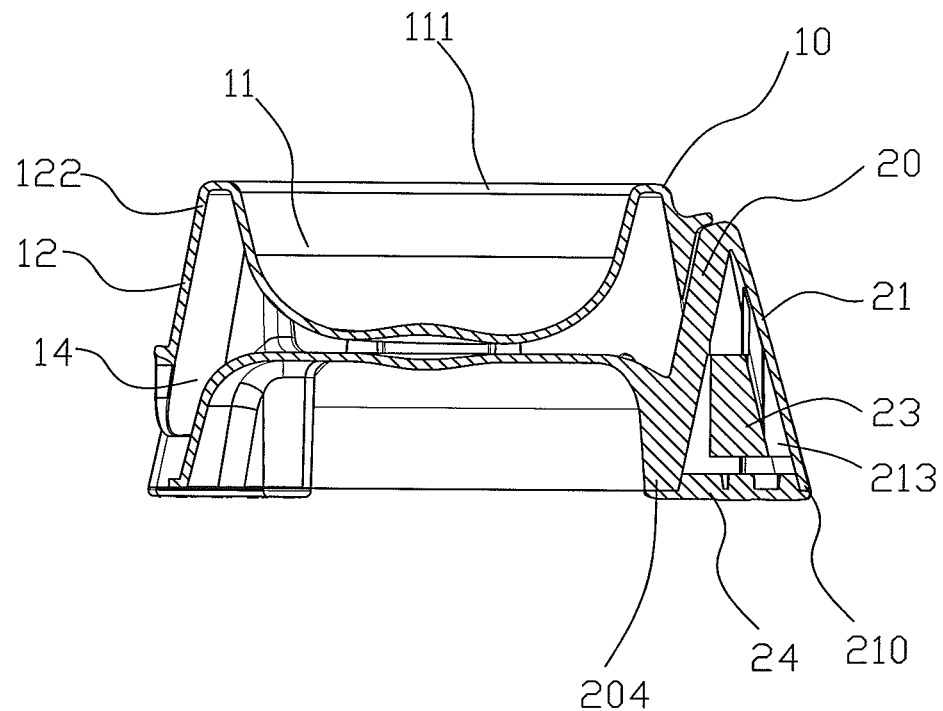
FIG. 3 is a sectional view of the pet feeder of FIG. 2.

A pet feeder according to an embodiment of the present invention is shown in FIGS. 1 through 3 of the drawings and includes an assembly base 20 and a feeder body 10. The assembly base 20 includes a generally round base body 201 which has an annular external rim 202, a top surface 203, and a bottom 204. The assembly base 20 further includes a plurality of pluggable fins 21. In this embodiment, the assembly base 20 includes, without limitation, three pluggable fins 21 protruding from the external rim 202 of the base body 201 and annularly spaced from one another. Each of the pluggable fins 21 has an upper end 211 and a lower end 210. The upper end 211 of each of the pluggable fins 21 exceeds the top surface 203 of the base body 201 in a height direction of the base body 201 and has a raised stop portion 212 on an inner end thereof. The lower end 210 of each of the pluggable fins 21 is generally level with the bottom 204 of the base body 201 in the height direction of the base body 201 and is internally provided with a recess 213 in which a counterweight 23 is received. The recess 213 is coupled and sealed with a non-slip pad 24 which is installed at a lower end of the recess 213.

The feeder body 10 includes an annular surrounding wall 12 and a feeding trough 11 defined inside the surrounding wall 12. At an upper end of the feeding trough 11 has an opening 111 through which pet foods can be poured. The surrounding wall 12 of the feeder body 10 has a bottom edge 121 and a top edge 122. Furthermore, the surrounding wall 12 of the feeder body 10 is provided with several sets of slots with distinct depths. In this embodiment, four sets of slots opened in the surrounding wall 12 of the feeder body 10 are a set of first slots 13a that are annularly spaced, a set of second slots 13b that are annularly spaced, a set of third slots 13c that are annularly spaced, and a set of fourth slots 13d that are annularly spaced, each of which includes a plurality of slots. Each set of first, second, third, and fourth slots 13a, 13b, 13c, and 13d is arranged in a circumferential direction about a central axis of the surrounding wall 12. Further, the set of first slots 13a, the set of second slots 13b, the set of third slots 13c, and the set of fourth slots 13d are annularly spaced from each other in the circumferential direction. In this embodiment, each set of first, second, third, and fourth slots 13a, 13b, 13c, and 13d includes, without limitation, three slots each of which has an identical depth. Each slot in each set of first, second, third, and fourth slots 13a, 13b, 13c, and 13d extends from the bottom edge 121 of the surrounding wall 12 toward but spaced from the top edge 122. The set of first slots 13a extends more deeply than the sets of second, third and fourth slots 13b, 13c and 13d in the height direction of the base body 201, the set of second slots 13b extends more deeply than the sets of third and fourth slots 13c and 13d, and the set of third slots 13c extends more deeply than the set of fourth slots 13d. Each slot in each set of first, second, third, and fourth slots 13a, 13b, 13c, and 13d has a width which matches one of the pluggable fins 21 to be inserted correspondingly. Furthermore, a spacing between two adjacent slots in each set of first, second, third, and fourth slots 13a, 13b, 13c, and 13d is substantially equal to a spacing between two adjacent pluggable fins 21, so that the pluggable fins 21 can be inserted into and detachably coupled with one of the sets of first, second, third, and fourth slots 13a, 13b, 13c and 13d optionally. Further, the set of first slots 13a, the set of second slots 13b, the set of third slots 13c, or the set of fourth slots 13d, which is coupled with the pluggable fins 21 of the assembly base 20, resists the upper ends 211 of the pluggable fins 2 and is limited by the stop portions 212 of the pluggable fins 21 for positioning the feeder body 10 on the assembly base 20. In addition, the feeder body 10 has a lower open space 14 over the base body 201 of the assembly base 20 for development of a secure pet feeder.

Figure 4A:
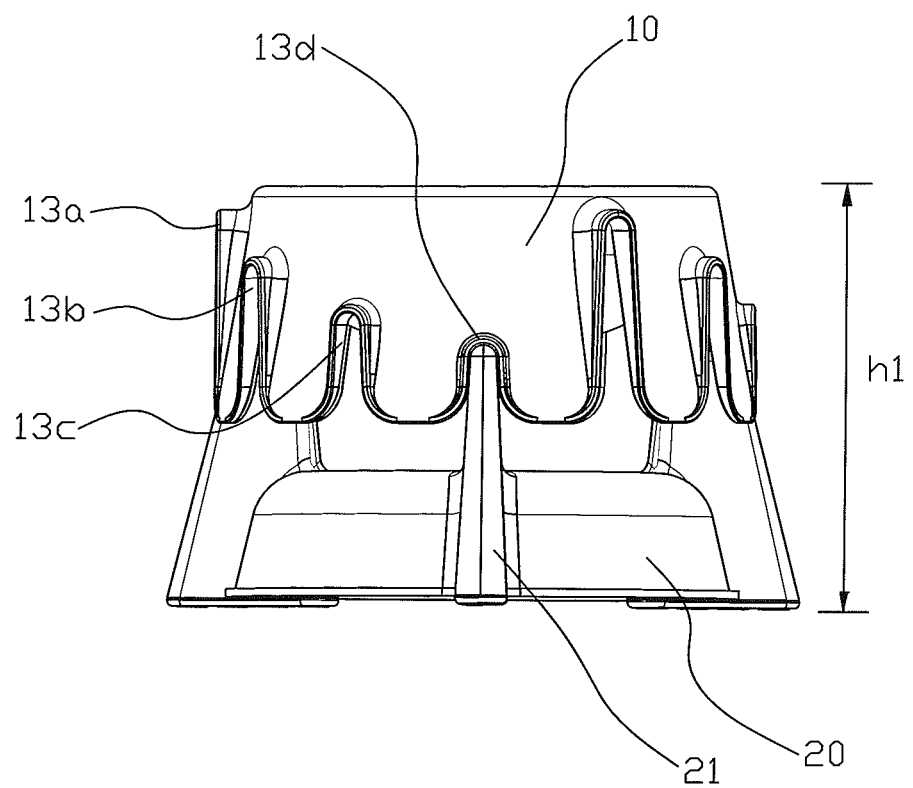
FIG. 4a is a schematic view of the pet feeder of FIG. 2 which is adjusted in height in an embodiment.
Figure 4B:
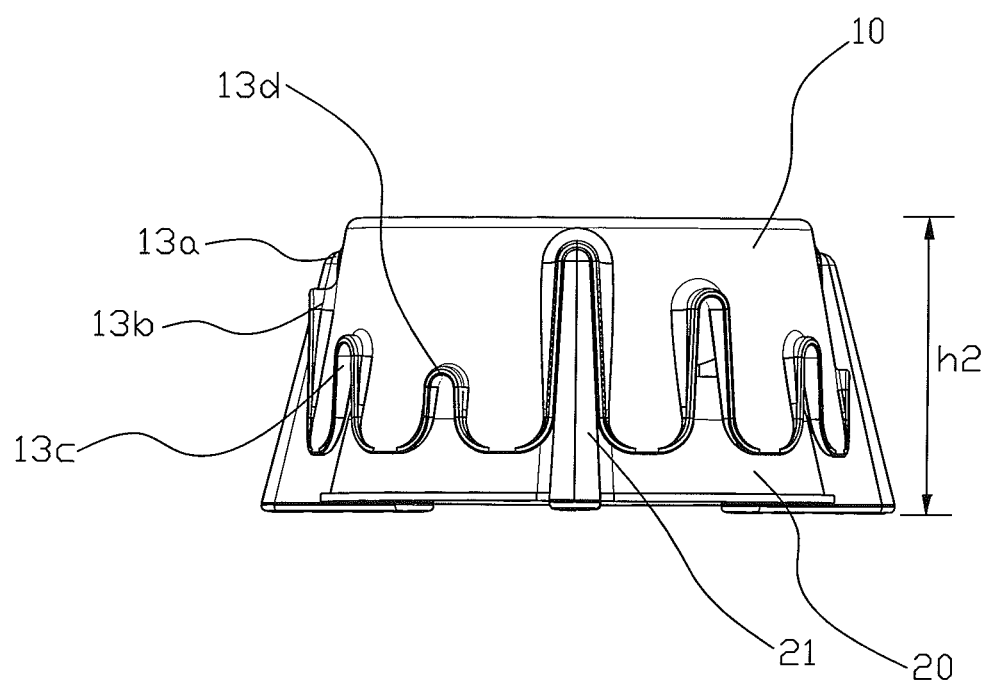
FIG. 4b is a schematic view of the pet feeder of FIG. 2 which is adjusted in height in another embodiment.

FIG. 4a illustrates the set of fourth slots 13d having a shortest depth coupled with the pluggable fins 21 of the assembly base 20. In this embodiment of FIG. 4a, the feeder body 10 is lifted to a greater height (h1) for a large-size pet. FIG. 4b illustrates the set of first slots 13a having a longest depth coupled with the pluggable fins 21 of the assembly base 20. In this embodiment of FIG. 4b, the feeder body 10 is lifted to a lower height (h2) for a small-size pet. As such, the pet feeder of the present invention will be available to any pet with a distinct size and needs not to be replaced frequently because the height of the feeder body 10 along with the height of the feeding trough 11 can be easily adjusted by a combination of the pluggable fins 21 of the assembly base 20 and one of the sets of first, second, third, and fourth slots 13a, 13b, 13c and 13d.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

The invention claimed is:

1. A pet feeder comprising:
an assembly base including a base body having an annular external rim, a top surface, and a bottom, with the assembly base further including a plurality of pluggable fins protruding from the external rim of the base body and annularly spaced from one another, with each of the pluggable fins having an upper end and a lower end, with the upper end of each of the pluggable fins extending beyond the top surface of the base body in a vertical direction above the base body; and
a feeder body including an annular surrounding wall and a feeding trough defined inside the surrounding wall, with the surrounding wall of the feeder body including a bottom edge and a top edge, with the surrounding wall of the feeder body provided with several sets of slots arranged in a circumferential direction about a central axis of the surrounding wall and annularly spaced from each other in the circumferential direction, with each of the several sets of slots including a plurality of slots shaped to receive the pluggable fins of the assembly base, with each of the several sets of slots extending from the bottom edge of the surrounding wall toward but spaced from the top edge, with the several sets of slots respectively extending a distinct depth in the vertical direction of the base body, with the plurality of slots in each of the several sets of slots having a substantially identical depth in the vertical direction of the base body, with a spacing between two adjacent slots in each of the several sets of slots being substantially equal to a spacing between two adjacent pluggable fins of the assembly base, wherein the pluggable fins are insertable into and coupled with one of the several sets of slots.

2. The pet feeder according to claim 1, wherein the lower end of each of the pluggable fins is generally level with the bottom of the base body in the vertical direction of the base body.

3. The pet feeder according to claim 2, wherein the upper end of each of the pluggable fins has a raised stop portion on an inner end thereof, wherein the one of the several sets of slots coupled with the pluggable fins of the assembly base resists the upper ends of the pluggable fins and is limited by the stop portions of the pluggable fins.

4. The pet feeder according to claim 1, wherein the upper end of each of the pluggable fins has a raised stop portion on an inner end thereof, wherein the one of the several sets of slots coupled with the pluggable fins of the assembly base resists the upper ends of the pluggable fins and is limited by the stop portions of the pluggable fins.

5. The pet feeder according to claim 1, wherein the lower end of each of the pluggable fins is internally provided with a recess in which a counterweight is received.

6. The pet feeder according to claim 5, wherein the recess is coupled with a non-slip pad which is installed at a lower end of the recess.

* * * * *